United States Patent [19]

Bickford

[11] 4,322,965
[45] Apr. 6, 1982

[54] CALIBRATION TEST STAND AND METHOD FOR HYDRAULIC WRENCHES

[75] Inventor: John H. Bickford, Middletown, Conn.

[73] Assignee: Raymond Engineering Inc,, Middletown, Conn.

[21] Appl. No.: 124,282

[22] Filed: Feb. 25, 1980

[51] Int. Cl.³ .............................................. G01L 25/00
[52] U.S. Cl. ..................................................... 73/1 C
[58] Field of Search ......................................... 73/1 C

[56] References Cited

U.S. PATENT DOCUMENTS

| | | | |
|---|---|---|---|
| 2,411,931 | 12/1946 | McVey | 73/1 C |
| 2,443,049 | 6/1948 | McVey | 73/1 C |
| 2,765,416 | 4/1955 | Thomas | 73/1 C |
| 2,955,454 | 10/1960 | Husher | 73/1 C |
| 3,456,486 | 7/1969 | Kross | 73/1 C |
| 4,171,647 | 10/1979 | Herrgeh | 73/1 C |

Primary Examiner—S. Clement Swisher
Attorney, Agent, or Firm—Fishman & Van Kirk

[57] ABSTRACT

A calibration test stand and method is presented for calibration of hydraulically powered torque wrenches. A hydraulic wrench to be powered by a pump is directly calibrated with the pump so that the pressure level of the pump can be accurately set to obtain the desired output torque level.

14 Claims, 4 Drawing Figures

4,322,965

CALIBRATION TEST STAND AND METHOD FOR HYDRAULIC WRENCHES

BACKGROUND OF THE INVENTION

This invention relates to torque wrenches which are powered by hydraulic fluid delivered by a pump. More particularly, this invention relates to a calibration test stand and method in which the pump and the wrench are mutually calibrated to determine the necessary pump output to achieve a desired torque from the wrench.

Hydraulically powered torque wrenches are well known in the art. A particularly useful kind of torque wrench is the type shown in U.S. Pat. No. 3,745,858, the disclosure of which is incorporated herein by reference. These torque wrenches are powered by hydraulic fluid from a pump which is connected to operate the power piston of the wrench. In using these wrenches, the typical approach in the prior art is to consult a chart which tells the user to set the pressure level of the pump to deliver hydraulic fluid at X psi to obtain Y torque output from the wrench. This typical prior art approach is susceptible to considerable inaccuracies from sources such as pump errors, gauge errors, etc.

SUMMARY OF THE INVENTION

In accordance with the present invention, a calibration stand is provided for a hydraulic wrench which is to be used with a particular pump. Preferably, the calibration stand and the pump are integral parts of a single self contained unit. The hydraulic wrench is mounted on the calibration stand and is connected to the pump. The pump is then operated and the torque output of the wrench is monitored by a readout mechanism until the desired operating output torque for the wrench is achieved. The output pressure of the pump at that wrench torque output level is then noted, and the calibration system is then shut down. Thereafter, the user of the wrench merely sets the pump output to the output level or pressure ratio previously noted, and the wrench will develop and deliver the desired output torque. The particular advantage of this invention is that it allows the user to adjust the pump as a function of the actual output torque of the wrench rather than as a function of the input hydraulic pressure to the wrench.

Accordingly, one object of the present invention is to provide novel and improved apparatus and method for calibration of a hydraulic wrench.

Still another object of the present invention is to provide novel and improved apparatus and method for calibration of a hydraulic pump as a function of the actual torque output of the wrench.

Other objects and advantages of the present invention will be apparent to and understood by those skilled in the art from the following detailed description and drawings.

BRIEF DESCRIPTION OF THE DRAWINGS

Referring to the drawings, wherein like elements are numbered alike in the several FIGURES:

FIG. 3 is a front elevation view of the calibration test stand of FIG. 2; and

DESCRIPTION OF THE PREFERRED EMBODIMENT

Figure 1:
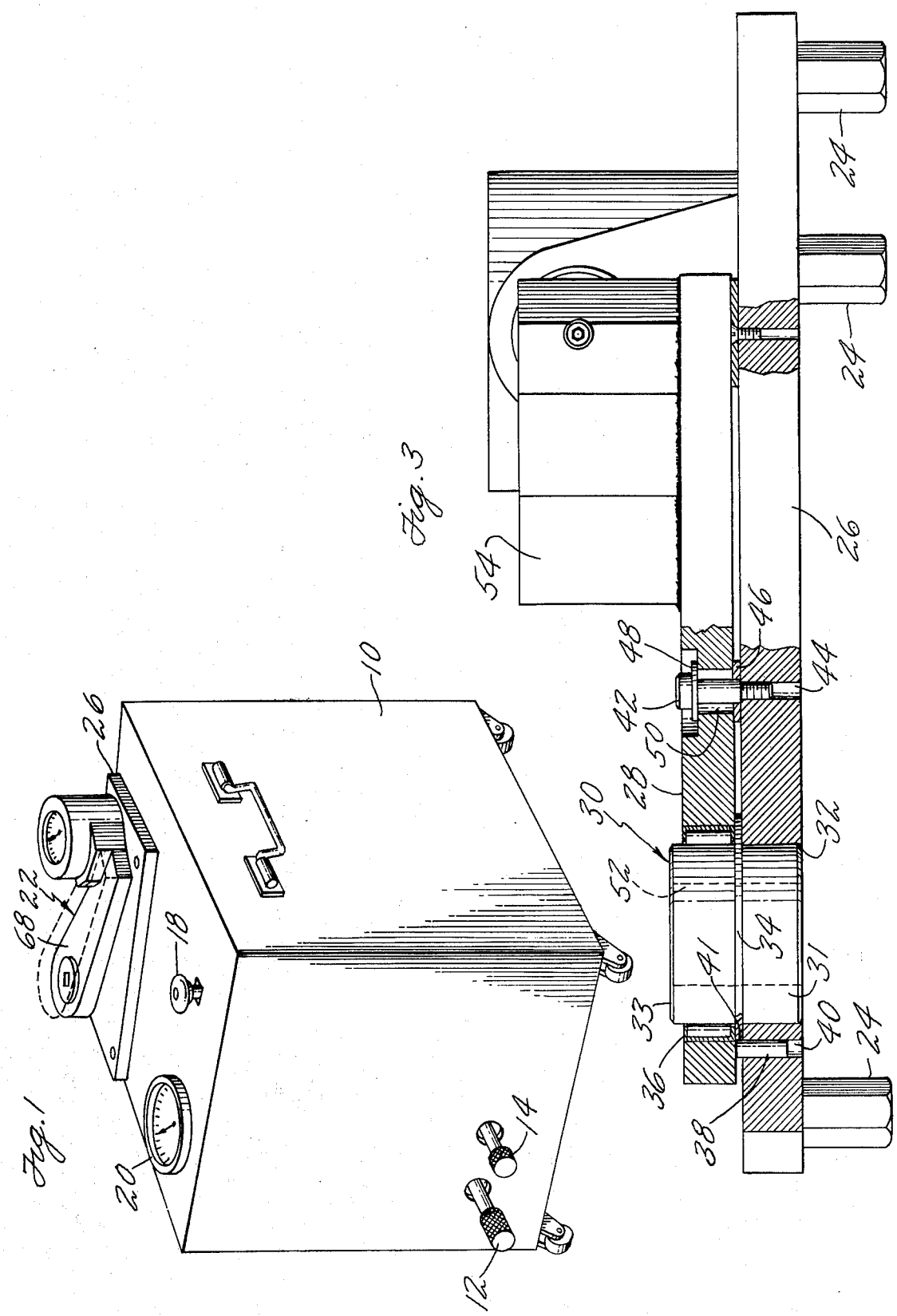
FIG. 1 is a perspective schematic representation of unitary power supply unit and calibration test stand for a hydraulic wrench.

Referring to FIG. 1, a metal cabinet 10 houses a hydraulic pump (not shown) which is to be used to provide hydraulic fluid under pressure for a hydraulically powered torque wrench such as that shown in U.S. Pat. No. 3,745,858. An output or delivery line 12 and a return line 14 project from the cabinet, the output and return lines being connected, respectively, to the discharge and inlet sides of the pump. Output line 12 is connected to the inlet side of the piston in a hydraulically powered wrench to cycle the wrench in the operative direction. Return line 14 is connected to return the hydraulic fluid to the pump inlet.

Control handle 18 is mounted on the top of cabinet 10 and is connected to a pressure regulating valve in the pump. Control handle 18 functions to control the maximum pressure outlet level of the pump.

A pressure readout gauge 20 is also mounted on the top of cabinet 10, pressure readout gauge 20 being connected to the discharge side of the pump to provide a readout in psi of the output of the pump.

A hydraulic wrench calibration stand 22 is also mounted on the top of cabinet 10. The calibration stand is mounted on cabinet 10 by a plurality of mounting lugs 24 (see FIG. 3) which depend from a base plate 26 and engage mating recesses in the body of cabinet 10 to secure the calibration stand to the cabinet.

Figure 2:
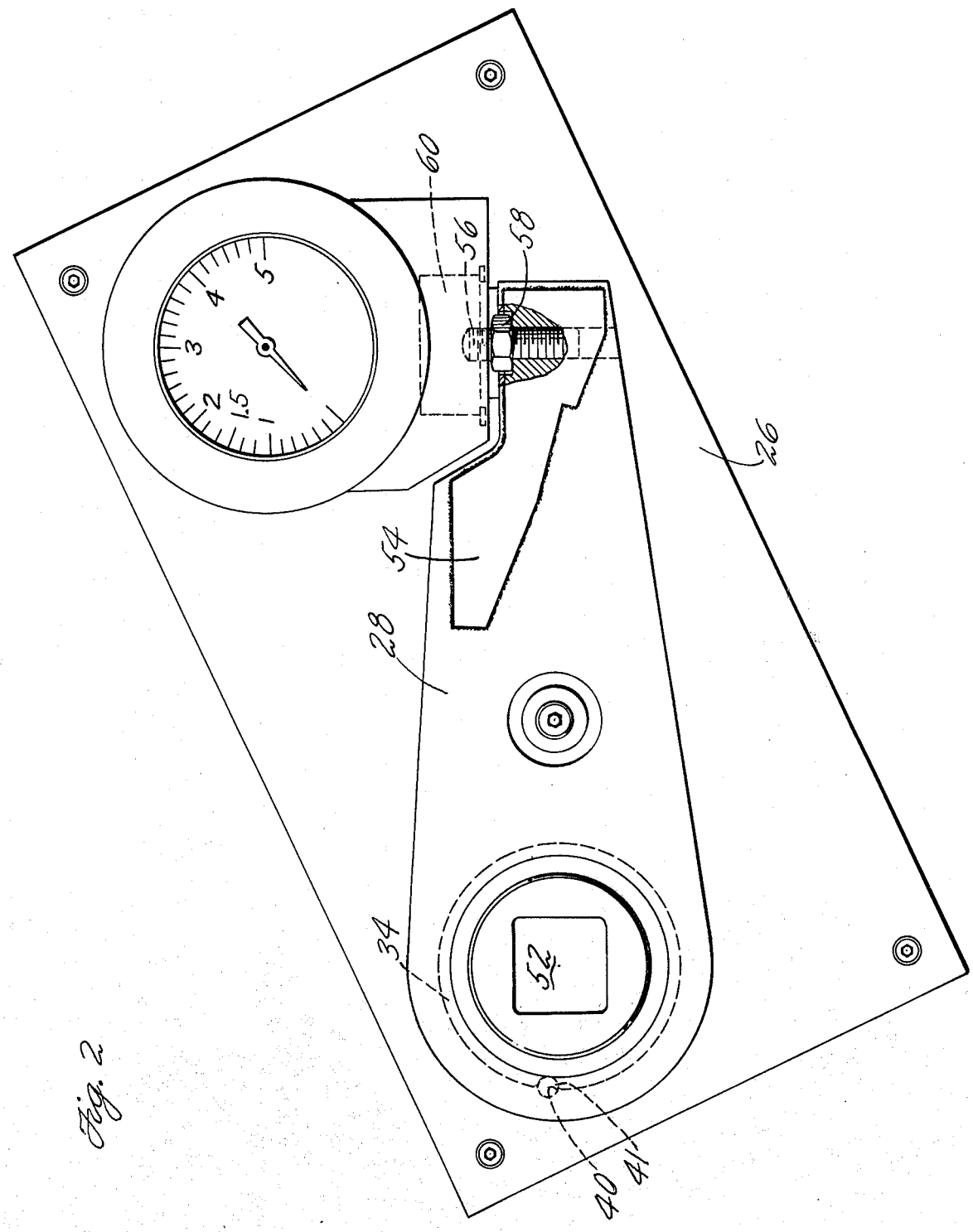
FIG. 2 is a plan view of the calibration test stand of the present invention.

Referring now to FIGS. 2 and 3, details of the calibration stand are shown. A pivot plate 28 is mounted on top of base plate 26. Pivot plate 28 is rotatably mounted about a cylindrical collar 30 which extends into circular opening 32 in base plate 26 and which is supported on base plate 26 by an annular flange 34 projecting from the middle of the collar and extending beyond the periphery of a hexagonal opening 32 in the base plate. The part 31 of collar 30 below flange 34 has a hexagonal exterior to mate with hexagonal opening 32 to lock collar 30 to base plate 26. The part 33 of collar 30 above flange 34 is cylindrical. A ball or roller bearing assembly 36 is positioned on collar segment 33 between the exterior of collar 30 and the body of pivot plate 28 to permit plate 28 to rotate freely relative to the axis of collar 30. A guide pin 38 is fixed in a hole 40 in plate 26, and pin 38 engages a notch 41 in flange 34 to insure that collar 30 is oriented properly when it is inserted in opening 32. Pivot plate 28 is also retained on base plate 26 by a stud 42 which is threaded into a recess 44 in base plate 26. Stud 42 carries a pair of spaced washers 46 and 48 which overlap an enlarged circular opening 50 in pivot plate 28. Enlarged opening 50 permits pivot plate 28 to rotate about the center or axis of collar 30 a limited degree without interference between pivot plate 28 and stud 42. Washer 46 serves both as a spacer and a sliding surface against which pivot plate 28 can move. Washer 48 is brought to bear against the recessed surface of pivot plate 28 with just light pressure so that washer 48 functions to retain pivot plate 28 on the base plate while not interfering with the pivotal motion of the plate 28. A shim 49 supports the right end of plate 26 while leaving the plate free to slide. A rectangular hole 52 is centrally located in collar 30 to receive the output bar of a wrench to be calibrated.

An irregularly shaped reaction block 54 extends upwardly from and is generally perpendicular to the surface of pivot plate 28. Reaction block 54 serves to receive the back end or reaction plate of a wrench to be calibrated (such as back plate 20 of the wrench shown in U.S. Pat. No. 3,745,858). Block 54 is irregularly shaped so that it can accomodate a range of wrenches or back plate sizes or locations.

A reaction button or post 56 is threadably engaged in the back side of block 54, and is held in place by a lock nut 58. Reaction post 56 serves to impose a load on a bellows 60 which is filled with hydraulic fluid and forms part of a force measuring and readout system which eventually results in a torque reading being displayed on readout Bourdon gauge 62.

Bellows 60, tubing 64 and gauge 62 form an integral unit in a housing 70. To accurately position bellows 60 relative to post 56, housing 70 rides on a key 72 on plate 26. When the bellows 60 and post 56 are coaxially aligned, holes are drilled into housing 70 to receive locking screws 74 which pass through pre-existing holes in baseplate 26.

Figure 4:
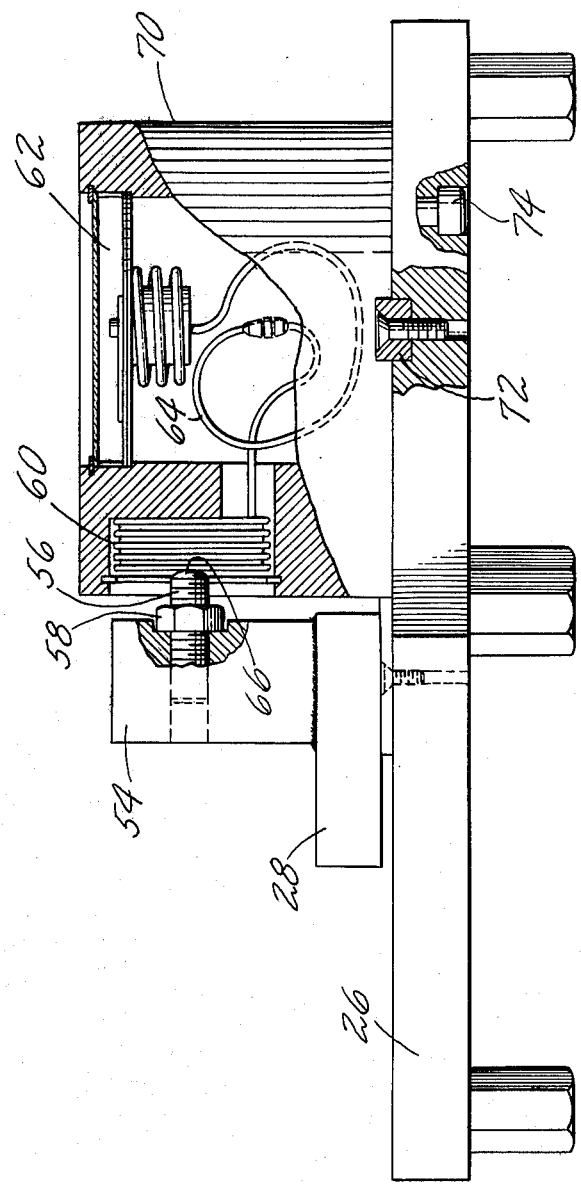
FIG. 4 is a side elevation view of the calibration test stand.

Referring to FIG. 4, the readout system for torque calibration is shown. Bellows 60 is connected to Bourdon gauge 62 by tubing 64, and both the interior of bellows 60 and tubing 64 are filled with a force transmitting hydraulic fluid to transmit actuating forces to Bourdon gauge 62. The front face of bellows 60 which abuts reaction post 56 has a concave recess 66 along the axis of the bellows. A curved end surface of reaction post 56 fits into recess 66 to impose reaction loads on the bellows in an axial direction, and those reaction loads are transmitted through the hydraulic fluid in the bellows and in tubing 64 to actuate Bourdon gauge 62 to provide a readout of torque.

To calibrate a hydraulically powered torque wrench, such as that shown in U.S. Pat. No. 3,745,858, the wrench is positioned on pivot plate 28 with an output bar from the wrench in locking engagement with opening 52 and with the rear or reaction plate (such as back plate 20 of the wrench of U.S. Pat. No. 3,745,858) bearing against reaction block 54. Pump control handles 16 and 18 are then set to desired, or approximately desired output levels, and the pump is operated to deliver pressurized hydraulic fluid to the operating hydraulic cylinder of the wrench. The wrench is shown in phantom at 68 of FIG. 1, and it will be understood that appropriate fluid lines (not shown) are connected from output 12 of the pump to the wrench to deliver actuating fluid to the actuating cylinder of the wrench.

Since opening 52 is in collar 30 which is fixed on base plate 26, which is in turn fixed to cabinet 10, the output torque delivered from the output of the wrench to opening 52 cannot turn collar 30. Rather, that force is reacted through the wrench to reaction bar 54 whereby pivot plate 20 will be caused to move in a counterclockwise direction about the axis of collar 30. This counterclockwise movement loads reaction post 56 against bellows 60 with a force equal to the actual output torque of the wrench, and that reaction force is transmitted through bellows 60 and tubing 64 to be displayed on Bourdon gauge 62.

It is of particular importance to note that the reading on gauge 62 is an accurate measurement of the actual output torque of the wrench. Thus, by noting the actual output torque of the wrench for various settings of control handles 16 and 18 (or for various pump output readings shown on gauge 20) the wrench may be calibrated for actual output torque regardless of errors or inaccuracies in the pump readout system. That is, by setting control handles 16 and 18 at a variety of settings, the user of the wrench is able to determine in advance the actual output torque of the wrench for various settings of control handles 16 and 18 and pump gauge 20. Thereafter, in actual operation of the wrench, all the operator has to do is set handles 16 and 18 to desired positions (or establish a desired reading on gauge 20) corresponding to a known torque output of the wrench for those settings. The wrench is then operated with confidence in the knowledge that the desired predetermined output torque is being delivered to the fastener, notwithstanding inaccuracies in the pump system. Thus, by use of the calibration stand of the present invention, inaccuracies in the pump system are circumvented, and the pump may be set as a function of actual output torque of the wrench rather than as a function of input pressure to the wrench.

While preferred embodiments have been shown and described, various modifications and substitutions may be made thereto without departing from the spirit and scope of the invention. Accordingly, it will be understood that the present invention has been described by way of illustration and not limitation.

What is claimed is:

1. A calibration test stand for a fluid powered wrench, the test stand including:
   base plate means;
   pivot plate means pivotally mounted on said base plate means for supporting a wrench to be calibrated;
   receiving means connected to said base plate means and fixed relative to said base plate means, said receiving means being shaped to receive an output from a wrench to be calibrated;
   reaction means connected to said pivot plate means, said reaction means being adapted to receive a reaction surface of a wrench to be calibrated; and
   force measuring means positioned to receive an input from said reaction means, said force measuring means providing a measurement of the output of a wrench to be calibrated for a preselected input load to the wrench.

2. A calibration test stand as in claim 1 wherein:
   said receiving means has a cylindrical collar extending above said base plate means; and
   said pivot plate means is pivotally mounted about said collar.

3. A calibration test stand as in claim 1 wherein:
   said force measuring means is mounted on said base plate means.

4. A calibration test stand as in claim 2 including:
   retaining means for retaining said pivot plate relative to said base plate means while permitting pivotal motion of said pivot plate means relative to said base plate means.

5. A calibration test stand as in claim 1 including:
   pump means for delivering a pressurized fluid to a wrench to be calibrated; and
   means for determining the pressure level of the fluid.

6. A calibration test stand for a fluid powered wrench, the test stand including:
   a base plate;
   socket means fixedly mounted in said base plate, said socket means having a shaped internal opening to receive an output from a wrench to be calibrated, and said socket means having a collar with a cylindrical outer surface above said base plate;

a pivot plate pivotally mounted about said collar, said pivot plate having a limited degree of pivotal motion relative to said base plate;

a reaction block extending from said pivot plate, said reaction block being adapted to receive a reaction load from a wrench to be calibrated; and force measuring means mounted on said base plate and positioned to receive a force input from said reaction block, said force measuring including a readout gauge to indicate the output level of a wrench to be calibrated for an input level of operating force delivered to the wrench.

7. A calibration test stand as in claim 6 including:

retaining means for retaining said pivot plate on said base plate, said retaining means being fixed to said base plate and extending through an enlarged opening in said pivot plate and overlapping an upper surface of said pivot plate.

8. A calibration test stand as in claim 6 wherein:

said reaction block has a reaction post extending toward said force measuring means; and said force measuring means includes a fluid filled bellows positioned to receive said reaction post and connected to said readout gauge.

9. A calibration test stand as in claim 6 wherein:

said socket means is releasably fixed to said base plate, and includes locating means to locate said socket means in a predetermined orientation to said base plate.

10. A calibration test stand as in claim 9 wherein said locating means includes:

a notch in a surface of said collar and a pin in said base plate.

11. A calibration test stand as in claim 6 including:

pump means for delivering a pressurized fluid to a wrench to be calibrated; and means for determining the pressure level of the fluid.

12. A method of calibrating a fluid operated wrench, including the steps of:

positioning a wrench to be calibrated on a pivot plate of a test stand, with the output of the wrench engaging a socket fixed to a base plate, the pivot plate being pivotally mounted on the base plate;

engaging a reaction block of the pivot plate with a reaction surface of the wrench;

supplying operating fluid under pressure to the wrench to operate the wrench;

monitoring the pressure level of the operating fluid delivered to the wrench;

delivering a reaction force from said reaction block to force measuring apparatus; and monitoring the force imposed on said force measuring apparatus to determine the output of the wrench for one or more selected pressure inputs to the wrench.

13. The method as in claim 12 wherein:

the step of supplying operating fluid to the wrench includes supplying hydraulic fluid at known pressure.

14. The method as in claim 12 wherein:

the step of delivering a reaction force to force measuring apparatus includes transmitting the reaction force through a reaction post to a bellows aligned with the reaction post, the bellows being filled with fluid and connected to a readout gauge.

* * * * *